United States Patent [19]

Omori

[11] 4,031,508

[45] June 21, 1977

[54] PUNCTURE ALARM DEVICE FOR A TIRE

[76] Inventor: Seita Omori, 1109-6 Oaza Sho, Tadotsu-cho, Nakatado, Kagawa, Japan

[22] Filed: Dec. 15, 1975

[21] Appl. No.: 640,436

[52] U.S. Cl. .................. 340/58; 340/224; 200/61.09
[51] Int. Cl.² ........................................ B60C 23/00
[58] Field of Search ............. 340/58, 63, 273, 280, 340/224; 200/61.22, 61.09; 116/34; 73/146, 146.5

[56] References Cited

UNITED STATES PATENTS

| 1,096,526 | 5/1914 | Brunig | 340/58 |
| 2,738,495 | 3/1956 | Hoff | 340/273 X |

*Primary Examiner*—Alvin H. Waring
*Attorney, Agent, or Firm*—Spensley, Horn & Lubitz

[57] ABSTRACT

In an automobile which uses a pneumatic tire, a puncture alarm device for one or more tires wherein a switching unit comprising conductive films formed on both the surfaces of an insulating material is disposed at the outer periphery of an air receiving portion of the tire, and when a metal piece or metal pile, such as a nail, sticks into the tire it penetrates through the switching unit and short-circuits the conductive films on both the surfaces thereof so that an alarm is issued.

8 Claims, 9 Drawing Figures

PUNCTURE ALARM DEVICE FOR A TIRE

BACKGROUND OF THE INVENTION

This invention relates to a puncture alarm device for a tire of an automobile wherein, when a nail or the like stickes into the tire during the running of the automobile, an alarm is immediately given so that steps may be taken before the air in the tire completely escapes.

BRIEF SUMMARY OF THE INVENTION

This invention in its broadest aspects relates to a puncture alarm device for a tire comprising a metal sensor means disposed within a typical tire. The sensor means is for determining when the a metal object has penetrated through the wall of the tire. The alarm device also includes alarm means for issuing an alarm. The alarm means is coupled to the sensor means such that the alarm means is actuated when the metal object enters the tire.

While the sensor means can take on a wide range of configurations, it has been found that it is preferably that the sensor means be snugly disposed against the inner peripheral wall of the tire. This enables the sensor means to easily determine when a metal object has pierced the tire. If such sensor means was located a distance from the inner wall of the tire, a metal object could pierce the tire without coming into contact with the sensor means. Thus, under such a system, air could leak out of the tire without any warning of the user.

The alarm means can also have many configurations. Basically, however, the alarm means is coupled to the sensor means such that when the sensor means is activated by the entry of a metal object into the tire, a signal is sent to the alarm means. The alarm means, in response to such signal, produces an output signal which puts the user on notice of the metal object in the tire. This type of system has special application which it is extremely important to obtain such information. For example, jet airliners, especially passenger airliners, pose potential human disasters should one or more tires be pierced by a metal object. If such information were known to the pilot, safety precautions could be taken to try and avert such disasters. The present invention can also be used by buses, trucks, cars and the like.

It is an object of this invention to provide a puncture alarm device for the tire which can immediately and reliably issue an alarm when a nail or the like sticks in the tire of an automobile.

Another object of the invention is to improve the safety of riders in an automobile.

Still another object of the invention is to confine the damage of an automobile to the minimum should a tire lose air by picking up a metal object.

BRIEF DESCRIPTION OF THE DRAWINGS

FIG. 5A illustrates an example of a concrete construction which uses a buzzer as an alarm appliance in FIG. 4, FIG. 5B illustrates another example in which the alarm is given by the use of an electric detonator, and FIG. 5C illustrates still another construction which transmits a signal by electric waves so as to initiate the alarm.

Detailed Description of the Preferred Embodiments

Figure 1A:
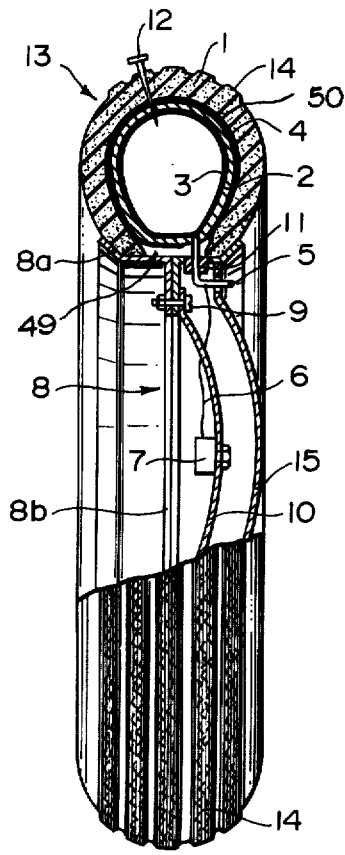
FIG. 1A is a side view of a tire broken away in order to illustrate the puncture alarm device according to this invention.
Figure 1B:
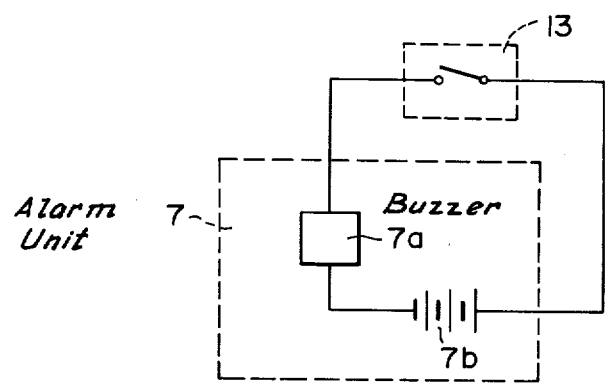
FIG. 1B is an electric circuit diagram of the puncture alarm device used in this invention.

FIG. 1A is a side view of a tire partially broken away, showing an embodiment of the puncture alarm device according to this invention. Referring to the figure, numeral 1 designates a typical tire which has a U-shaped cross-section. Disposed with tire 1 is an inner tube 2. Tube 2 is inserted into tire 1 through an opening 49 so as to be circumferentially encased by tire 1. The tube 2 is circular in section and is made of an insulating material such as rubber. Tube 2 contains air therein, and its outer surface lies in contact with the curved inner surface 50 of tire 1. Such tube-type tires are well known in the art. The tire 1 to be equipped with the puncture alarm device is the pneumatic tire type which is used with the air contained in the tube 2. The inner and outer surfaces of the tube 2 are respectively formed with electrically conductive films 3 and 4, i.e., tube 2 is sandwiched between films 3 and 4 which are therefore in a substantially parallel but spaced apart configuration. The conductive films 3 and 4 are formed by, for example, coating the inner and outer surfaces of tube 2 with a metallic foil such as aluminum foil; applying a conductive paint to the inner and outer surfaces; or disposing metal nets or conductive rubber on such surface. The conductive film 3 formed on the inner surface lies in contact with a tube mouthpiece 5 made of metal, and is electrically connected therewith. Further, it is connected to an alarm unit 7 by a lead wire 6. On the other hand, the conductive film 4 formed on the outer surface of tube 2 lies in contact with an outerperipheral rim portion 8a of a metallic wheel 8, and it leads to section 8b. In the preferred embodiment, wheel 8 has an inner section 8b joined to an outer section 8a by screw means 9 or other attaching means. Thus, wheel 8 closes the inner-peripheral opening part of the tire 1 by the outer-peripheral rim portion 8a, and it supports tire 1 by the inner rim portion 8b. The screw 9 also fixes an alarm unit holding the fixture 10 to the section 8b of wheel 8 while keeping the electrical connection, so that the conductive film 4 is electrically connected via the alarm holding fixture 10 the the alarm unit 7 which is secured to the fixture 10. Of course, the tube mouthpiece 5 and the wheel 8 are electrically insulated by an insulating bushing 11. Under the usual state, the alarm device is held in the "open-circuit" state by tube 2 of insulating property. However, when, as illustrated in FIG. 1A, a nail 12 or the like sticks in the tire 1 and penetrates through the tube 2, the conductive films 3 and 4 respectively formed on the inner and outer surfaces of the tube 2 are short-circuited therebetween. Then, the alarm device falls into the "closed-circuit" state, and the alarm 7 issues an alarm. Thus, in the alarm device shown in FIG. 1A, the tube 2 and the conductive films 3 and 4 formed on the inner and outer surfaces thereof constitute a switching unit 13. An electric circuit diagram of the puncture alarm device of FIG. 1A is shown in FIG. 1B. In this figure, the switching unit 13 and the alarm unit 7 are respectively enclosed with dotted lines. Shown at 7a and 7b are a buzzer and a battery, respectively, which are used for the alarm unit 7. The buzzer 7a and the battery 7b are arranged in series. Since the alarm device illustrated in FIG. 1A is of such electric circuit, usually the switching unit 13 is in the open state and the buzzer 7a does not operate, whereas when a metal pile or metal piece such as nail 12 sticks in the tire 1 and short-circuits the conductive film therebetween, the switching means 13 is closed and the buzzer 7a provides the alarm. In FIG. 1A, numeral 14 designates a tire tread, and numeral 15 denotes a wheel cap. In order to facilitae hearing of the alarm sound, the wheel cap 15 should preferably be made the windowed type. Such type caps are well known in the art.

Figure 2A:
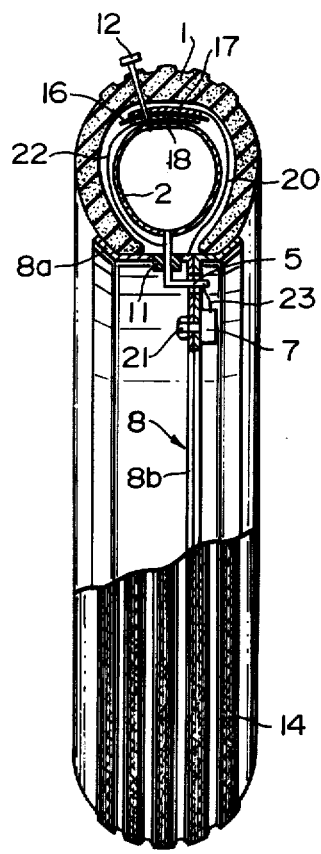
FIG. 2A is a side view of a tire broken away in order to show the puncture alarm device according to this invention, employing a strip switching unit.
Figure 2B:
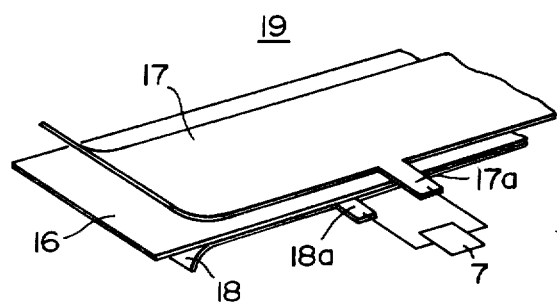
FIG. 2B is a developed perspective view of parts of the strip switching unit.

In this manner, in the alarm device according to the present invention, the switching unit is formed by utilizing the tire tube and providing the conductive films on both its surfaces as shown by way of example in FIG. 1A. The switching unit may also be formed in such way that, instead of forming the conductive films on the inner and outer surfaces of the tube, a strip of insulating material separately employed is provided with conductive films on both the surfaces. The switching unit is disposed on the outside periphery of the tire tube which is the air receiving portion. FIG. 2A is a side view of a tire partially broken away, showing such alarm device. FIG. 2B is a developed view of the strip switching unit of the alarm device used in the tire 1 illustrated in FIG. 2A. As shown in FIG. 2B, the switching unit 19 is formed by providing the conductive films 17 and 18, similar to films 3 and 4 of FIG. 1A, on the front and back surfaces of a strip of insulating material 16 such as polyvinyl chloride. The conductive films 17 and 18 are respectively provided with terminals 17a and 18a, which are electrically connected with the alarm unit 7. Such switching unit is interposed between the tire 1 and a typical inner tube 2 as illustrated in FIG. 2A. The terminal 17a is electrically connected to the outer-peripheral rim portion 8a of the metallic wheel 8 through a lead wire 20 and leads to the body 8b of the wheel 8. Thus, terminal 17a is electrically connected with the alarm unit 7 which is secured to the body 8b by a screw 21. On the other hand, the terminal 18a is electrically connected through a lead wire 22 to the metallic tube mouthpiece 5 and via a further lead wire 23 to the alarm unit 7. Alarm unit 7 is electrically coupled to body 8b as discussed with reference to FIG. 1A. In this manner, in the alarm device according to the present invention, the strip switching unit 19 may be arranged on the outside periphery of the tire tube 2, whereby the nail 12 or the like sticking in the tire 1 can close the switching unit 19 and actuate the alarm unit 7 of the alarm device. The other symbols in FIG. 2A referred to above are the same as those employed for the corresponding parts in FIG. 1A. The embodiment of FIGS. 2A and 2B wherein the strip switching unit is formed and is arranged between the tire and the tube, is easier in the attachment to and detachment from the tire than the embodiment of FIGS. 1A and 1B wherein the switching unit is formed by making use of the tube. Moreover, the former is far easier than the latter in the fabrication of the switching unit itself. These represent further improvements over the prior art.

Figure 3:
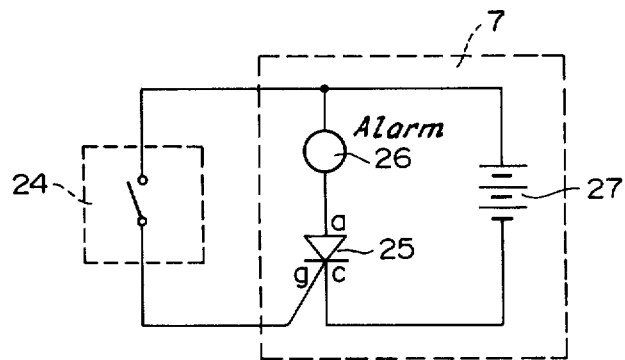
FIG. 3 is an electric circuit diagram of the puncture alarm device according to this invention which uses a silicon-controlled rectifier element (SCR).

As previously stated, the alarm device according to this invention is formed, for example, with the conductive films by coating the front and back surfaces of an insulating material with a metallic foil such as aluminum foil; applying a conductive paint to the insulating material; or disposing metal nets or conductive rubber thereon. If the conductive films formed on the front and back surfaces of the insulating material have a low specific resistance, no problem will be involved. However, if a comparatively high resistivity of, for example, approximately 3 ohm-centimeter in the case of the conductive rubber is exhibited, it will be sometimes impossible to cause a necessary current to flow by means of a limited power source. Where the conductive films of comparatively high resistivity ar formed, an alarm can be issued by an alarm device having an electric circuit as shown in FIG. 3. In the FIGURE, numeral 24 indicates a switching unit. The switching unit 24 is incorporated between the anode $a$ and gate $g$ of a silicon-controlled rectifier element (SCR) 25 so that a plug voltage may be applied to the gate $g$ of the SCR 25 upon closure of the switching unit 24. An alarm appliance, such as buzzer 26 and a battery 27 are disposed in series between the anode $a$ and cathode $c$ of the SCR 25. Therefore, when the nail or the like sticks in the tire to short-circuit the conductive films therebetween and to close the switching unit 24, a current flows from the gate $g$ to the cathode $c$ of the SCR 25. The SCR 25 is triggered, and the anode $a$ and the cathode $c$ are conducted therebetween. A main current whose load is the alarm appliance 26 is caused to continually flow by the power source 27. In this way, if only the current for triggering the SCR 25 is secured, the anode current with the first-mentioned current amplified flows through the alarm appliance 26, and the alarm appliance 26 can be operated. In fact, the SCR may be one of the very small size having an anode current of about 0.2 amps. Consequently, the trigger current may be a minute one of several ma. In experiments, the alarm could be issued even in case where the resistance of the conductive film was as high as 2,000 ohms.

Figure 4:
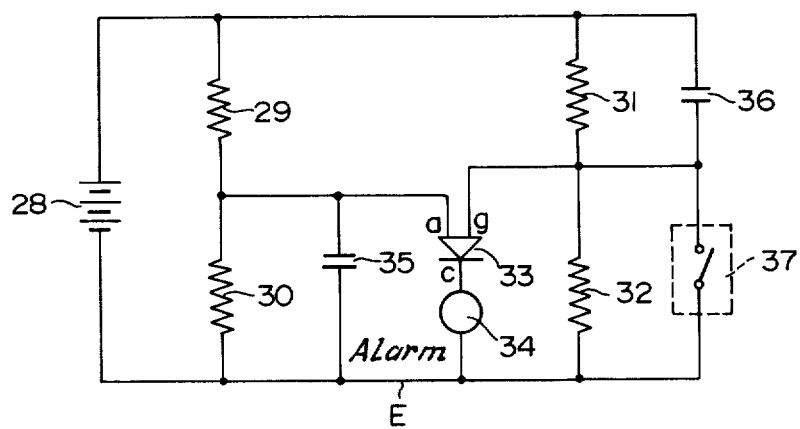
FIG. 4 illustrates a case of employing a semiconductor element for preventing a malfunction, and is an electric circuit diagram of the puncture alarm device according to this invention which employs a programmable unijunction transistor (PUT) by way of example.

In the actual use of the alarm device according to this invention, the conductive films may be short-circuited therebetween because of conduction due to water or inferior insulation permitting a leakage current to flow. In order to obtain a perfect alarm device free from such malfunction, a circuit as shown by way of example in FIG. 4 may be adopted. The circuit of FIG. 4 is an example employing a programmable unijunction transistor (PUT). The PUT 33 is incorporated so that a voltage of a power source 28 may be divided by resistances 29 and 30, a voltage across the resistance 30 being applied to the gate a of the PUT, and that the voltage of the power source 28 may be divided by resistances 31 and 32, a voltage across the resistance 32 being applied to the gate $g$ of the PUT. An alarm appliance 34 is connected to the cathode $c$ of the PUT 3. A capacitor 35 for increasing the operating current of the PUT 33 is connected in parallel with the resistance 30, while a capacitor 36 for stabilizing the gate voltage of the PUT 33 is connected in parallel with the resistance 31. Further, a switching unit 37 is provided in parallel with the resistance 32. When viewed from an ground wiring E, the anode $a$ and gate $g$ of the PUT 33 are respectively subject to the following voltages:

$$V_a = V \times \frac{R_{30}}{R_{29} + R_{30}}$$

$$V_g = V \times \frac{R_{32}}{R_{31} + R_{32}}$$

where $V_a$ denotes the anode voltage, $V_g$ the gate voltage, and $V$ the voltage of the power source 28. $R_{29}$, $R_{30}$, $R_{31}$ and $R_{32}$ indicate the values of the resistances 29, 30, 31 and 32, respectively. Owing to the characteristic of the PUT, when the anode voltage $V_a$ is smaller than the gate voltage $V_g$, no current flows from the anode $a$ to the cathode $c$. However, when the nail or the like sticks in the tube and the conductive films are short-circuited therebetween, the gate $g$ goes to ground and the anode voltage $V_a$ becomes larger than the gate voltage $V_g$. When the anode voltage $V_a$ is larger than the gate voltage $V_g$, a current flows from the anode $a$ to the cathode $c$, so that the alarm appliance 34 is operated. For example, when the insulation of the switching unit 37 is degraded in such electric circuit, the degradation is equivalent to the reduction of the value of the resistance 32. It is therefore feared that the gate voltage $V_g$ will decrease and that the anode voltage $V_a$ will become greater than the gate voltage $V_g$. However, such malfunction can be prevented by setting the gate voltage $V_g$ to be sufficiently high relative to the anode voltage $V_a$. Assuming by way of example:

$R_{29}$:500 kΩ
$R_{30}$:4500 kΩ
$R_{31}$:2 KΩ
$R_{32}$:48 KΩ
V : 4.5 V then $$V_a = 4.5 \times \frac{4500}{500 + 4500} = 4.05$$

$$V_g = 4.5 \times \frac{\frac{48 R_{37}}{48 + R_{37}}}{2 + \frac{48 R_{37}}{48 + R_{37}}} = \frac{108 R_{37}}{48\ 30\ 25\ R_{37}}$$

where $R_{37}$ denotes the insulation resistance of the tube. Therefore, in order that the anode voltage $V_a$ may be smaller than the gate voltage $V_g$, $$4.05 < \frac{108 R_{37}}{48 + 25 R_{37}}$$

that is, $R_{37} > 28.8$ KΩ. In this case, accordingly, even when the tube insulation resistance $R_{37}$ decreases to 29 $k\Omega$, it is greater than the aforementioned numerical value 28.8 yet, and hence, no malfunction arises. The sensitivity can be changed by varying the respective resistance values. The malfunction of the alarm device may therefore be prevented by determining the respective resistance values so as to realize an appropriate sensitivity in conformity with a design etc.

In this manner, the reverse bias voltage is applied to the semiconductor element, such as PUT, by the use of the voltage divider resistances so as to check the operation of the semiconductor element, and therewith, the reverse bias voltage is applied to the switching unit. When the metal pile or metal piece sticks in the tire so that the switching unit falls into the closed state and that the reverse voltage lowers, then the semiconductor element becomes operative and the alarm is issued. At this time, the malfunction ascribable to the inferior insulation can be prevented by adequately setting the values of the respective voltage divider resistances. Although the circuit employing the PUT as the semiconductor element has been exemplified in FIG. 4, the malfunction can be similarly prevented by the use of a constant-voltage diode, a transistor, an SCR or the like.

Figure 5A:
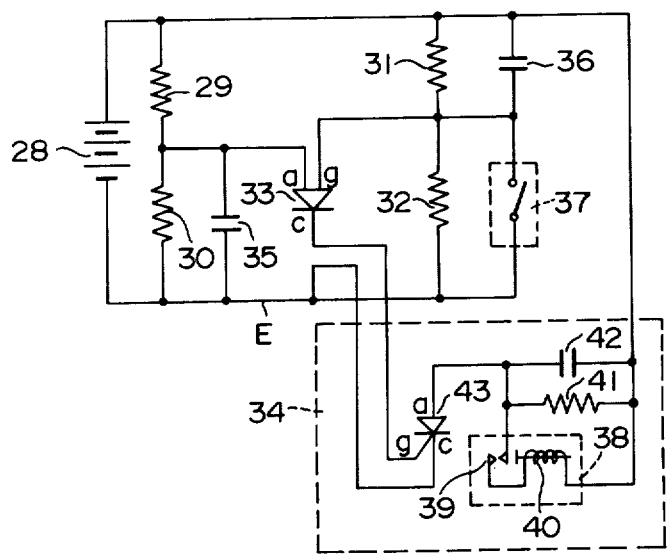
FIGS. 5A, 5B and 5C are electric circuit diagrams of the puncture alarm devices according to this invention and especially show means to issue alarms. Among the figures.

As the alarm unit for use in the puncture alarm device of this invention, the combination of the battery and the buzzer is generally considered. However, where the metal piece sticking in the tire is, for example, an old nail, it is sometimes the case that the conductive films are not prefectly short-circuited therebetween on account of an oxide film covering the surface of the nail. In such case, the buzzer will not sound continually if the simple circuit consisting merely of the buzzer, the battery and the switching unit connected in series is used as the alarm circuit. In actuality, therefore, the alarm circuit need jointly employ a relay or semiconductor element having the self-holding property, such as SCR and PUT. FIG. 5A illustrates an example of one embodiment where a buzzer is used as the alarm appliance 34 in FIG. 4. Numeral 38 indicates the buzzer. The buzzer 38 is composed of a vibration contact 39 and a diaphragm attracting coil 40. In parallel with the buzzer 38, a resistance 41 of about 20 ohms and a capacitor 42 of about 0.01 microfarad are incorporated. The capacitor 42 serves for the extinction of arc of the vibration contact 39. The anode $a$ side of an SCR 43 is connected to one end of the parallel circuit. The gate $g$ of the SCR 43 is connected with the cathode $c$ of a PUT 33, while the cathode $c$ of the SCR 43 is connected with an ground wiring E. The other end of the parallel-connected buzzer 38, resistance 41 and capacitor 42 is connected with one terminal of a capacitor 36. Thus, when a switching unit 37 is closed, a signal voltage is generated between the cathode $c$ of the PUT 33 and the ground wiring E. This voltage triggers the SCR 43 and causes a current to flow through the buzzer 38. Then, the buzzer 38 issues an alarm. The issuance of the alarm by the buzzer is generally made by the interruption of the vibration contact. However, when the vibration contact 42 is disengaged, the anode current of the SCR 43 does not flow through buzzer 38. On the basis of the characteristic of the SCR, when the anode current stops, the SCR will switch to the off state if no gate voltage is present during a zero current crossing. As the result, the buzzer 38 cannot continue to sound. Therefore, the bypass resistance 41 is incorporated and causes a small amount of self-holding current to continually flow in order that the anode current of the SCR 43 may be prevented from becoming zero even when the vibration contact 42 is disengaged.

Figure 5B:
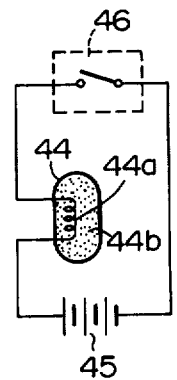

The circuit employing the relay or the semiconductor element is comparatively expensive. Where this poses a problem, an alarm can be issued by replacing the buzzer with an electric detonator as shown in FIG. 5B. More specifically, the electric detonator 44 and a battery 45 are connected in series. When a switching unit 46 is closed, a current flows through a filament 44a of the electric detonator 44, and a suitable amount of explosive 44b is blown up. Thus, the alarm is given forth. Also in this case of employing the electrical detonator 44, the alarm can be readily raised merely by the flow of the instantaneous current.

Figure 5C:
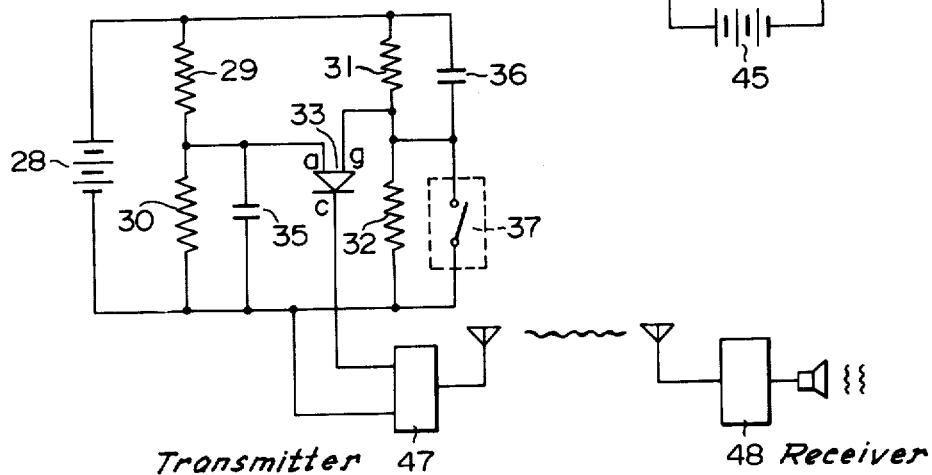

FIG. 5C shows a construction in which a small-sized electric-wave generator is mounted on a tire in place of the buzzer, alarm electric waves are transmitted from the generator, the alarm electric waves are received by a receiver mounted on a car body, and an alarm is issued near a driver seat. In the construction of FIG. 5C, the alarm appliance 34 in FIG. 4 is replaced with the generator or transmitter 47 and the receiver 48. The receiver 48 having caught the alarm electric waves generated by the transmitter 47 gives forth an alarm sound or alarm light and immediately informs the driver of the danger. Where such small-sized electric-wave transmitter is attached, it can never occur that the driver will not take notice of the alarm on account of the cancellation of the alarm by noises.

As previously stated, in accordance with this invention, as soon as the nail sticks in the tire, the alarm can be issued. The invention is therefore advantageous in that the necessary precautionary step can be taken before the air pressure of the tire lowers, and that the safety of the automobile or other mode of transportation can be enhanced. A further advantage is that the damage of the tire tube can be minimized.

It is to be understood that although this invention has been disclosed and described with reference to a particular embodiment, the principles involved are susceptible of other applications which will be apparent to persons skilled in the art. This invention, therefore, is not intended to be limited to the particular embodiment herein disclosed.

I claim:

1. In a puncture alarm for a tire, including sensor means disposed within said tire, said sensor means for providing a change in electrical characteristic in response to the puncturing of said tire by a conductive object, and including an alarm and detection circuit means for producing an output signal in response to said sensor means to activate said alarm, said detection circuit means coupled to said sensor means and alarm, and comprising:
    a power supply;
    gate means coupled to said alarm for producing said output signal; and
    compensation means coupled to said power supply, sensor means and gate means for biasing said gate means such that said output signal is produced only when said electrical caracteristic assumes a value outside of a preselected range, said compensation means for allowing a predetermined magnitude of degradation of said electrical characteristic without causing a false alarm.

2. The detection circuit means of claim 1 wherein: said electrical characteristic is the impedance of said sensor means, said impedance tending to degrade with time and wear.

3. The detection circuit means of claim 2 wherein:
    said gate means is a programmable uninjunction transistor; and
    said compensation means is a network of passive electrical elements coupled between said power supply, said programmable uninjunction transistor, and said sensor means.

4. The detection circuit means of claim 1 further comprising:
    latch circuit means for producing a steady output signal in response to transient excursions of said electrical characteristic outside said preselected range.

5. A detection circuit means in a puncture alarm for a tire, said detection circuit means coupled to an alarm, sensor means for providing a decrease in resistance in response to the puncturing of said tire by a conductive object, said detection circuit for activating said alarm in response to a decrease of said resistance below a preselected value, said detection circuit comprising:
    a power supply;
    an uninjunction transistor having a first and second gate and cathode and producing an output signal to activate said alarm whenever said second gate is at a potential less than said first gate, said cathode being coupled to said alarm;
    a compensation network including a first voltage divider coupled to said power supply and to said first gate, and a second voltage divided coupled to said power supply and said second gate, said sensor means coupled at least in part in parallel with said second voltage divided with respect to said power supply, said first and second voltage dividers proportioning the potential applied to said first and second gates such that said resistance of said sensor may decrease up to a preselected value without altering the operation of said detection circuit.

6. The detection circuit of claim 5 further comprising:
    latch circuit means having an input coupled to said cathode and an output coupled to said alarm, said latch circuit means for producing a steady output signal in response to transient reductions of said resistance below said preselected value.

7. The detection circuit of claim 5 wherein said alarm is coupled to said detection circuit by a telemetric coupling circuit.

8. The detection circuit means of claim 1 wherein said gate means is a silicon controlled rectifier having an anode and cathode in series circuit with said alarm and power supply and having a gate coupled to said sensor means.

* * * * *